3,260,657
METHOD OF MAKING ELECTROTYPE PLATE USING REMOVABLE POLYVINYL ALCOHOL FILM
Edward F. Hogan, Andover, Mass., assignor to Chemical Products Corporation, East Providence, R.I., a corporation of Rhode Island
No Drawing. Filed June 2, 1959, Ser. No. 817,459
10 Claims. (Cl. 204—6)

This invention relates to the manufacture of electrotype plates and pertains more specifically to an improved and simplified procedure for the manufacture of electrotype plates for printing.

In the conventional procedure for the manufacture of electrotype plates, the desired metal type along with any desired logotypes, half-tones, etc., is set up in a chase or galley. A sheet of thermoplastic polymeric composition, usually a relatively stiff, hard, vinyl polymer or copolymer composition, is then pressed against the metallic type body while being subjected to heat and pressure in order to mold the face of the sheet to conform to the metal type. The thermoplastic polymeric composition is then cooled and removed from the metal type face, cleaned carefully, and a thin layer of conductive material such as silver is then applied to the molded face of the sheet by a chemical reduction process which involves application of a sensitizer to the molded face of the sheet followed by exposure to a solution of a silver salt. After initial deposition of the thin film of metal, additional metal is applied by a conventional electrodeposition procedure until a self-sustaining shell of substantial thickness has been built up, whereupon the metallic plate is stripped from the thermoplastic backing sheet. The metallic shell thus formed, which is still relatively thin, can readily be curved if desired or left in its flat condition, and backed up with suitable additional metals such as lead or a low-melting lead alloy to provide the desired strength.

One difficulty with the conventional procedure as outlined above is the problem of cleaning the molded face of the thermoplastic polymeric sheet prior to deposition of the initial metal film. This cleaning step is very critical since failure to obtain a completely clean surface results in uneven deposition of the metal film and the presence of pinholes in the film which interfere with the electrodeposition of additional metal and result in a defective plate. Since the metal type frequently has residual ink on its face as a result of proofing and since this ink film, together with any dust or dirt adhering to it, tends to be transferred to the thermoplastic sheet during molding, the cleaning problem is a serious one.

I have now discovered that highly satisfactory electrotype plates can be made by applying a conductive metal film to a conventional thermoplastic polymeric backing sheet prior to the molding or forming step, thus obviating the necessity for applying a metal film to a dirty surface of the thermoplastic composition.

In accordance with the present invention, a backing sheet of conventional thermoplastic polymeric composition such as a vinyl resin composition, polymers and copolymers of vinyl chloride being preferred, is subjected to a conventional vacuum metalizing operation during which a thin film of either silver or copper is applied to a face of the backing sheet. While either silver or copper alone may be employed, best results are obtained by first applying a thin film of silver to the backing sheet, following which a thin film of copper is applied, also by vacuum metalizing, over the silver film. When only a single vacuum metalizing step is carried out, the film of metal such as silver has a resistance of approximately three ohms per square, which is entirely satisfactory for use during the electrodeposition step which follows. When the initial film of silver is followed by a second film of copper, the electrical resistance of the combined metal film is less than one ohm per square, which permits accelerated electrodeposition of additional metal.

While conventional hard and stiff vinyl resin backing sheet material, which has a thickness of 0.010 to 0.040 inch, may be subjected to a vacuum metalizing operation in carrying out the procedure of the present invention, it is preferred to employ a relatively thin sheet of such material for the vacuum metalizing operation, the sheet having a thickness of the order of 0.010 inch, usually from 0.005 to 0.015 inch, because the cost of the vacuum metalizing operation is less for the thinner gauges.

The thermoplastic polymeric backing sheet carrying the metallic film on its face is then placed in a hydraulic press with its metalized face adjacent the body of type which serves as a mold and is subjected to heat and pressure in the usual manner in order to mold the metalized face of the backing sheet to conform to the type. It is found that the very thin films of silver or copper applied by the vacuum metalizing process are sufficiently ductile so that they conform readily to the type face along with the thermoplastic composition during the molding operation. When a relatively thin metallized thermoplastic backing sheet having a thickness of the order of 0.010 inch as described above is employed, it is desirable that it be built up and strengthened prior to the electroplating operation. To this end an additional reinforcing sheet of thermoplastic polymeric composition, preferably identical with that employed for the backing sheet and having a thickness from 0.010 to 0.030 inch, is placed in the hydraulic press along with the metalized backing sheet and is thus laminated with the backing sheet by subjecting both sheets together to heat and pressure during the molding operation. The resultant molded laminated sheet will have a thickness of the order of 0.015 to 0.045 inch so that it can readily be removed from the type face after molding and subjected to the electroplating operation without risk of tearing.

The molded sheet is removed from the press, upon cooling, in the usual manner and is cleaned if necessary in order to prepare it for the electrodeposition of additional metal. This cleaning step is not so critical as the one required for the formation of a metallic film on a nonconductive plastic surface by chemical reduction methods and is greatly simplified by the fact that a continuous film of conductive metal is already present at the molded surface.

The molded backing sheet carrying the layer of conductive metal on its face is then subjected to a conventional electroplating operation to deposit additional copper on it to build up a sheet having a thickness of the order of 0.005 to 0.015 inch. The low initial resistivity of the metalized face of the molded sheet of the present invention makes it possible to deposit the additional metal at a high rate of speed during the plating operation.

Following the electroplating operation, the self-sustaining metallic shell is stripped from the thermoplastic backing sheet in the usual manner and is further strengthened and reinforced by backing up with lead or a low-melting lead alloy to a total thickness of ⅛ to ¼ inch as is well known in the art.

If desired, the necessity for cleaning the molded metalized face of the sheet after separation from the type face can be eliminated by employing a protective interlayer consisting of a thin film of either cold-water-soluble or hot-water-soluble polyvinyl alcohol which is interposed between the type face and the metalized face of the backing sheet. The polyvinyl alcohol film employed for this purpose preferably is as thin as possible, having a thickness of the order of 0.0005 to 0.003 inch. While this film maintains its integrity during the molding operation and does not fuse with the material of the backing sheet, it conforms so perfectly to the mold face that perfect reproduction is obtained in the backing sheet even in the case of very fine half-tones. The film of polyvinyl alcohol is readily stripped from the molded metalized face of the backing sehet after cooling, thus ensuring that none of the ink, dirt, dust, etc., which may be present on the metal type face comes in contact with the metalized face of the backing sheet.

The polyvinyl alcohol parting film may also be used during the molding of conventional thermoplastic vinyl resin composition backing sheets containing polymers and copolymers of vinyl chloride which carry no metal film on their face during the molding operation, thus ensuring a completely clean molded surface which can subsequently be coated with a metal film by the conventional chemical reduction process.

Instead of employing a preformed film of polyvinyl alcohol, it is possible to form the film in situ on the face of either the metal type body or the thermoplastic polymeric backing sheet, either metalized or not, which is to be molded. For example, a solution containing 10% to 20% by weight of polyvinyl alcohol in a water-ethyl alcohol mixture may be applied to the desired surface either by dipping or by spraying and allowed to dry. It is desirable to incorporate a dye such a gentian violet in the solution so that the extent and thickness of the coating can readily be controlled, during the spraying operation, by observation of the color of the coating. The protective film thus formed may be removed in the same manner as the preformed film after the molding operation. The solution conveniently can be sprayed from a pressure container charged with a suitable pressure propellant such as Freon, propane, isobutane, or the like.

Although specific embodiments of the invention have been described herein, it is not intended to limit the invention solely thereto, but to include all of the obvious variations and modifications within the spirit and scope of the appended claims.

What is claimed is:

1. The method of making an electrotype plate which comprises: vacuum metalizing a face of a thermoplastic polymeric composition backing sheet with a thin film of a metal selected from the class consisting of copper and silver; interposing between the metalized face of said backing sheet and the type face of the electrotype plate, a thin self-sustaining water soluble film of polyvinyl alcohol; subjecting said metalized backing sheet to heat and pressure to mold the metalized face thereof to conform to desired type face; stripping said polyvinyl alcohol film from the backing sheet after the molding operation; electrodepositing additional metal on the molded metalized face to provide a self-sustaining metal shell; and stripping said metal shell from said backing sheet.

2. The method as defined in claim 1 in which said polyvinyl alcohol film is formed by spraying a solution of polyvinyl alcohol on one of the opposing faces of said type face and said backing sheet.

3. The method as defined in claim 1 in which the backing sheet subjected to vacuum metalizing has a thickness from 0.005 to 0.015 inch and said backing sheet is laminated with a reinforcing sheet of thermoplastic polymer composition from 0.010 to 0.030 inch thick during said molding step.

4. The method of making an electrotype plate which comprises vacuum metalizing a face of a thermoplastic polymeric composition backing sheet with a thin film of silver, applying to said silver film a thin film of copper by vacuum metalizing to provide a metallic surface having a resistance less than one ohm per square, interposing between the metalized face of said backing sheet and the type face of the electrotype plate, a thin self-sustaining water-soluble film of polyvinyl alcohol, subjecting said metalized sheet to heat and pressure to mold said metalized face to conform to the desired type face, stripping said polyvinyl alcohol film from the backing sheet after the molding operation, electrodepositing additional metal on the molded metalized face to provide a self-sustaining metal shell, and stripping said metal shell from said backing sheet.

5. In the method of making an electrotype plate which comprises molding against a metal type face a backing sheet comprising a thermoplastic vinyl resin composition, the steps which comprise interposing between the metal type face and the backing sheet prior to the molding operation a thin self-sustaining water soluble film of polyvinyl alcohol, and stripping said film from the backing sheet after the molding operation.

6. The method as defined in claim 5 in which said film is from 0.0005 to 0.003 inch in thickness.

7. The method as defined in claim 5 in which said film is formed from a solution of polyvinyl alcohol in situ on one of the opposing faces of said type face and said backing sheet.

8. In the method of making an electrotype plate which comprises molding against a metal type face a backing sheet comprising a thermoplastic vinyl resin composition, the steps which comprise interposing between the metal type face and the backing sheet prior to the molding operation a thin self-sustaining water soluble film of polyvinyl alcohol, stripping said film from the backing sheet after the molding operation, electrodepositing metal on the molded face of the backing sheet to provide a self-sustaining metal shell, and stripping said metal from said backing sheet.

9. The method as defined in claim 8 in which said film is from 0.0005 to 0.003 inch in thickness.

10. The method as defined in claim 8 in which said film is formed from a solution of polyvinyl alcohol in situ on one of the opposing faces of said type face and said backing sheet.

References Cited by the Examiner

UNITED STATES PATENTS

| | | | |
|---|---|---|---|
| 2,172,563 | 9/1939 | Libberton | 204—6 |
| 2,172,564 | 9/1939 | Libberton | 204—6 |
| 2,400,518 | 5/1946 | Kreber et al. | 204—6 |
| 2,510,999 | 6/1950 | Oldofredi | 204—6 |
| 2,631,955 | 3/1953 | Muskat | 156—323 XR |
| 2,631,960 | 3/1953 | Dafter | 156—323 XR |
| 2,670,326 | 2/1954 | Bungay | 204—6 |
| 2,680,699 | 6/1954 | Rubin | 204—20 |
| 2,725,324 | 11/1955 | Holes | 154—120 |
| 2,731,378 | 1/1956 | Strachan | 154—120 |
| 2,765,248 | 10/1956 | Beech et al. | |

WINSTON A. DOUGLAS, *Primary Examiner.*

JOHN H. MACK, JOSEPH REBOLD, JOHN R. SPECK, ALLEN B. CURTIS, *Examiners.*

E. L. HANDLEY, R. GOOCH, *Assistant Examiners.*